United States Patent
Park et al.

(10) Patent No.: US 8,794,007 B2
(45) Date of Patent: Aug. 5, 2014

(54) ROCKET PROPULSION DEVICE AND METHOD FOR ASSEMBLING ROCKET PROPULSION DEVICE

(75) Inventors: Sung Han Park, Daejeon (KR); Soon Il Moon, Daejeon (KR); Bang Eop Lee, Daejeon (KR); Jae Beom Park, Daejeon (KR)

(73) Assignee: Agency for Defense Development, Daejeon (KR)

( * ) Notice: Subject to any disclaimer, the term of this patent is extended or adjusted under 35 U.S.C. 154(b) by 0 days.

(21) Appl. No.: 13/576,712

(22) PCT Filed: Feb. 8, 2010

(86) PCT No.: PCT/KR2010/000754
§ 371 (c)(1),
(2), (4) Date: Aug. 2, 2012

(87) PCT Pub. No.: WO2011/096608
PCT Pub. Date: Aug. 11, 2011

(65) Prior Publication Data
US 2012/0291443 A1 Nov. 22, 2012

(51) Int. Cl.
*F02K 1/00* (2006.01)
*F02C 7/20* (2006.01)

(52) U.S. Cl.
USPC .............................. 60/770; 60/796

(58) Field of Classification Search
USPC ......... 60/796–799, 200.1, 770; 102/377, 378; 89/1.14
See application file for complete search history.

(56) References Cited

U.S. PATENT DOCUMENTS

| | | | |
|---|---|---|---|
| 3,427,047 A | * | 2/1969 | Mayo ................................ 285/3 |
| 4,150,540 A | | 4/1979 | Krayenbuhl et al. |
| 4,203,569 A | | 5/1980 | Marks |
| 4,232,843 A | | 11/1980 | Clark et al. |

FOREIGN PATENT DOCUMENTS

| | | |
|---|---|---|
| JP | 2002-054781 A | 2/2002 |
| KR | 10-2010-0048275 A | 5/2010 |

OTHER PUBLICATIONS

International Search Report dated Oct. 25, 2010 issued in PCT/KR2010/000754.

* cited by examiner

*Primary Examiner* — Phutthiwat Wongwian
*Assistant Examiner* — William Breazeal
(74) *Attorney, Agent, or Firm* — Scully, Scott, Murphy & Presser, P.C.

(57) ABSTRACT

A rocket propulsion device including, a case having a propellant therein, the case in the form of a tube, a nozzle having at least part inserted in the case, and configured to discharge gas upon burning the propellant, and a locking unit disposed to be wound on the nozzle, the locking unit in the form of a band having both ends open, wherein a through hole for inserting the locking unit therein is formed at one region on a circumference of the case, and the both ends of the locking unit are located at a region facing the one region, whereby a rocket propulsion device having a simplified structure and a facilitated alignment of a thrust line can be implemented.

5 Claims, 3 Drawing Sheets

ROCKET PROPULSION DEVICE AND METHOD FOR ASSEMBLING ROCKET PROPULSION DEVICE

TECHNICAL FIELD

The present invention relates to a rocket propulsion device propelled along a thrust line and a method for assembling the same.

BACKGROUND ART

An initial flight stability of unguided rockets or guided missiles greatly depends on a misalignment angle of a thrust line of a propulsion device. The misalignment angle of the thrust line of a propulsion system denotes a deviation angle that the thrust line is deviated from a centerline of the propulsion system upon burning of the propulsion system.

The causes of the thrust line misalignment of the propulsion system may include, for example, nozzle offset, nozzle misalignment, propellant charge misalignment and the like. Particularly, for the unguided rocket, upon the generation of the thrust line misalignment, accuracy rate as well as flight stability are drastically lowered.

For the prevention of the thrust line misalignment, a method of coupling a nozzle by use of screws or bolts may be employed. However, the coupling method needs the thickness of the nozzle which is as thick as allowing the coupling of the bolts, thereby causing an increase in a weight of a rocket propulsion device. Furthermore, the coupling method requires additional assembly processes, such as a hole processing for the bolt coupling, a bolt assembly and the like.

To solve such problems, a rocket propulsion device which is capable of preventing the misalignment of the thrust line of the propulsion device can be considered.

DISCLOSURE OF INVENTION

Technical Problem

Therefore, it is an object of the present invention to provide a rocket propulsion device capable of implementing an alignment of a thrust line and a method for assembling the same.

It is another object of the present invention to more economically implement a rocket propulsion device and a method for assembling the same.

Solution to Problem

To achieve these objects, there is provided a rocket propulsion device including a case, a nozzle and a locking unit. The case may have a propellant therein and configured in the form of a tube. The nozzle may have at least part thereof inserted in the case, and configured to discharge gas upon burning the propellant. The locking unit may be disposed to be wound on the nozzle and configured in the form of a band having both ends open. A through hole for inserting the locking unit therein may be formed at one region on a circumference of the case. The both ends of the locking unit may be located at a region facing the one region.

In one aspect of the present invention, the case may include a first groove formed in an inner circumferential surface thereof and the nozzle may include a second groove formed in an outer circumferential surface thereof. The locking unit may be inserted into the first and second grooves so as to connect the case and the nozzle to each other.

In another aspect of the present invention, a locking protrusion stopped at the nozzle may be formed at one end of the locking unit. A region adjacent to another end of the locking unit may have the same section as that between the both ends of the locking unit.

In accordance with another embodiment of the present invention, there is provided a method for assembling a rocket propulsion device including inserting a nozzle, inserting a locking unit, locking at the nozzle and locating the locking unit. The inserting of the nozzle may be configured to insert the nozzle into a case configured in the form of a tube. The inserting of the locking unit may be configured to insert the locking unit through a through hole formed at one region on a circumference of the case to thusly be wound on the nozzle. The locking at the nozzle may be configured to lock a locking protrusion formed at one end of the locking unit at the nozzle. The locating of the locking unit may be configured to locate both ends of the locking unit at a region facing the one region. The method may further include fixing the nozzle to restrict a relative movement between the case and the nozzle.

Advantageous Effects Of Invention

In the rocket propulsion device according to the present invention having such configuration, the both ends of the locking unit are located to face the through hole so as to achieve a symmetric rigid structure. Accordingly, the misalignment of a thrust line of the rocket propulsion device can be prevented or decreased.

According to the present invention, the locking unit disposed to be wound on the nozzle can allow connection between the case and the nozzle within a narrower space, resulting in more economic implementation of a rocket propulsion device and a method for assembling the same.

BEST MODE FOR CARRYING OUT THE INVENTION

Figure 1:
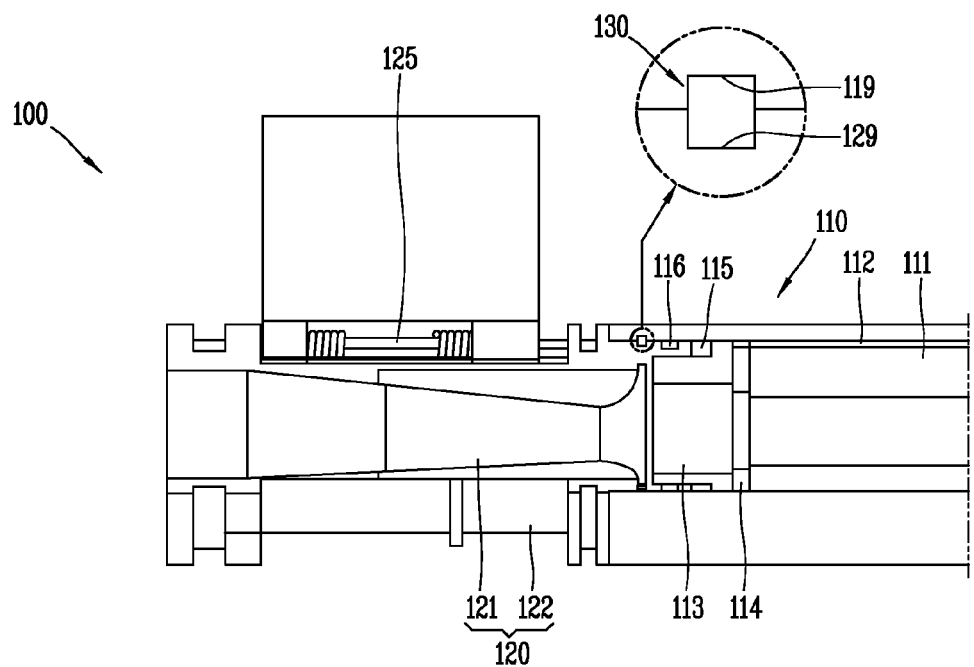
FIG. 1 is a sectional view showing a rear side of a rocket propulsion device in accordance with one embodiment of the present invention.

Description will now be given in detail of a rocket propulsion device and a method for assembling the same according to the present invention, with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

Figure 2:
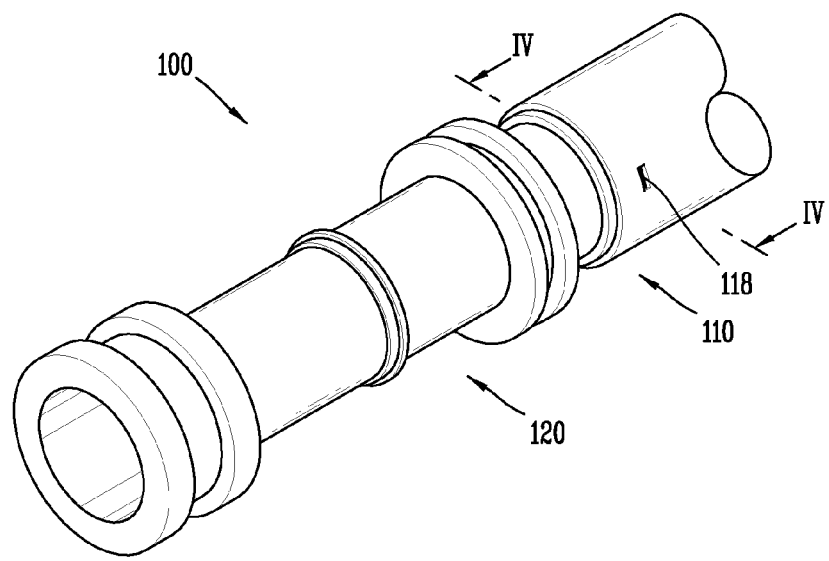
FIG. 2 is a perspective view showing a rear side of the rocket propulsion device of FIG. 1.

FIG. 1 is a sectional view showing a rear side of a rocket propulsion device 100 according to one embodiment of the present invention, and FIG. 2 is a perspective view of the rocket propulsion device 100 of FIG. 1.

The rocket propulsion device 100 may include a case 110, a nozzle 120 and a locking unit 130.

The case 110 may be in the form of a tube. The case 110 is shown having therein a propellant 111 for generating combustion gas due to combustion. The case 110 may have a hermetic space for maintaining high pressure which is generated when the propellant 111 is burned.

A circumference anti-combustion member 112 may be provided between the case 110 and the propellant 111. The circumference anti-combustion member 112 may protect the rocket propulsion device 100 from high temperature risen by combustion heat of the propellant 111.

An end sleeve 113 may be formed adjacent to one end of the case 110.

An end inhibitor 114 may be disposed between the end sleeve 113 and the propellant 111 for preventing contact between the end sleeve 113 and the propellant 111, resulting in preventing damage on the end sleeve 113 due to high temperature gas.

A sealing ring 115 may be disposed at an outer circumference of the end sleeve 113. The sealing ring 115 may prevent leakage of high temperature gas.

At least part of the nozzle 120 may be inserted in the case 110. Referring to the drawings, the end sleeve 113 may be inserted into one end of the nozzle 120. An O-ring 116 for maintaining a gastight state may be disposed between an outer circumferential surface of the nozzle 120 and an inner circumferential surface of the case 110.

The nozzle 120 may be configured to discharge gas generated by burning the propellant 111. The rocket propulsion device 100 may generate high combustion force when high temperature and high pressure gas is discharged out of the nozzle 120.

The nozzle 120 may include a heat resistant member 121 and a nozzle body 122.

The heat resistant member 121 may have a section which extends or decreases in one direction. The heat resistant member 121 may be formed of a heat resistant material for protecting the nozzle 120 from the highly heated combustion gas.

The nozzle body 122 may be connected to the case 110 by virtue of the locking unit 130. The locking unit 130 may be disposed to be wound on the nozzle 120.

The locking unit 130 may be in the form of a band having both ends 131a and 131b (see FIG. 5) open. The locking unit 130, for example, may be a spring lock wire.

Referring to FIG. 2, a through hole 118 in which the locking unit 130 is inserted may be formed through one region 117a on a circumference of the case 110. The both ends 131a and 131b of the locking unit 130 may be located at a region 117b (see FIG. 4) facing the one region 117a of the case 110.

Portions with fragile rigidity at the rocket propulsion device 100 may symmetrically exist by locating the both ends of the locking unit 130 at an opposite side of the through hole 118.

Figure 3:
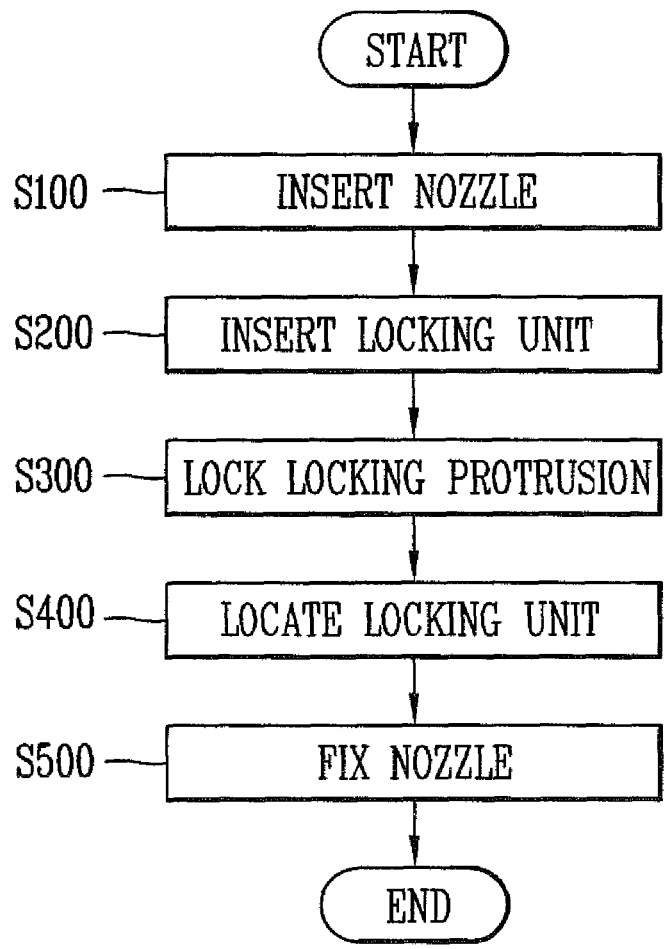
FIG. 3 is a flowchart showing a method for assembling the rocket propulsion device in accordance with another embodiment of the present invention.

FIG. 3 is a flowchart showing a method for assembling the rocket propulsion device in accordance with another embodiment of the present invention.

First, the nozzle is inserted into the case in the form of a tube (S100).

The locking unit is inserted into the through hole, formed at one region on a circumference of the case, so as to be wound on the nozzle (S200).

The locking unit may be gradually inserted into the through hole to be wound on an outer circumferential surface of the nozzle. The nozzle may be provided with a groove along the outer circumferential surface to guide the winding of the locking unit. A groove for accommodating the locking unit wound on the nozzle may be formed at an inner circumferential surface of the case at a position corresponding to the groove of the nozzle. Such grooves allow connection between the nozzle and the case.

After being wound on the nozzle by an angle of 360°, both ends of the locking unit may be located near the through hole.

A locking protrusion formed at one end of the locking unit is connected to the nozzle (S300). To this end, a locking groove in which the locking protrusion is stopped may be formed at the nozzle.

The both ends of the locking unit are disposed at a region facing one region on a circumference of the case (S400). For example, when the nozzle is rotated based upon a central axis of the nozzle, the locking unit having one end locked at the nozzle is cooperatively rotated. Accordingly, the locking unit can be rotated by an angle of approximately 180°. Here, the method of locating the both ends of the locking unit by rotating the nozzle may not limit the method of disposing the locking unit 300 (see FIG. 1) of the rocket propulsion device 100 according to the present invention.

If two portions with fragile rigidity at the rocket propulsion device are overlaid, the nozzle may be rotated due to a relative difference of rigidity upon applying an internal pressure, which may cause misalignment of a thrust line. According to the aforementioned method, the both ends of the locking unit can be located to face the through hole, thereby implementing a symmetric rigid structure of the rocket propulsion device. Also, the misalignment of the thrust line of the rocket propulsion device can be prevented or decreased.

The method for assembling the rocket propulsion device may further include fixing the nozzle to restrict a relative movement between the case and the nozzle. The fixing of the nozzle can be implemented in a manner of connecting the case to the nozzle by using pins (such as the pins 125 shown in FIG. 1), whereby torsion of a symmetric rigid structure of the rocket propulsion device can be prevented or decreased.

Hereinafter, a rocket propulsion device assembled by the method for assembling the rocket propulsion device will be described with reference to FIGS. 4 and 5.

Figure 4:
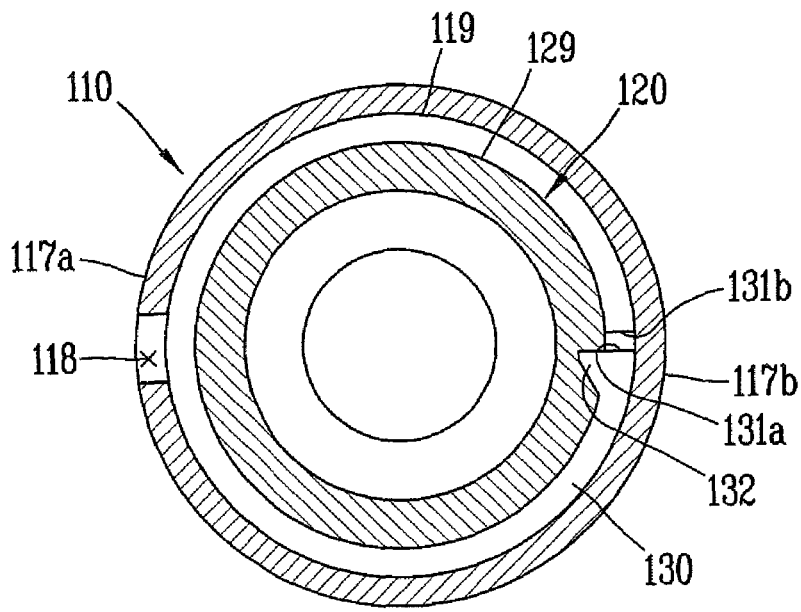
FIG. 4 is a sectional view of the rocket propulsion device taken along the line of FIG. 2.
Figure 5:
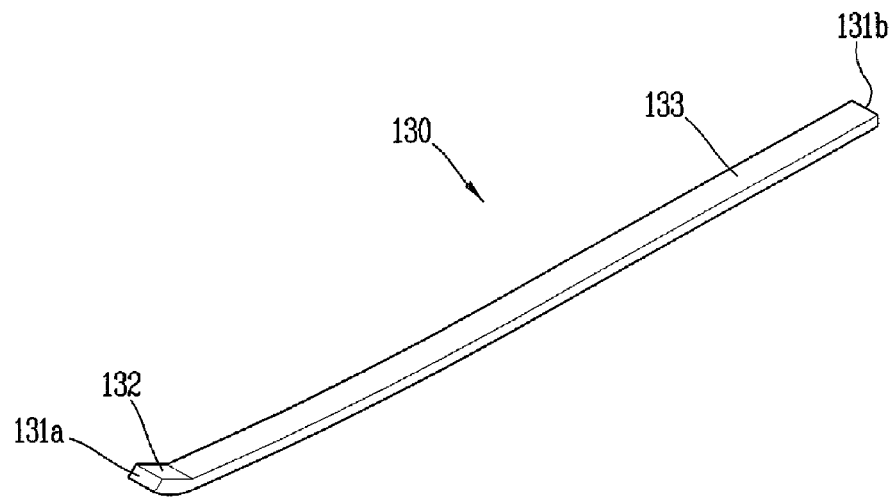
FIG. 5 is a perspective view showing a locking unit of the rocket propulsion device of FIGS. 4.

FIG. 4 is a sectional view of the rocket propulsion device 100 adapting the method for assembling the rocket propulsion device, taken along the line IV-IV of FIG. 2, and FIG. 5 is a perspective view showing the locking unit of the rocket propulsion device 100 of FIG. 4.

The through hole 118 and the both ends 131a and 131b of the locking unit 130 are disposed to face each other, which results in prevention or decrease of nozzle offset, nozzle misalignment and the like due to asymmetric rigidity.

The case 110 may include a first groove 119 formed at its inner circumferential surface. The nozzle 120 may include a second groove 129 formed at its outer circumferential surface. The locking unit 130 may be inserted into the first and second grooves 119 and 129 so as to connect the case 110 and the nozzle 120. The case 110 and the nozzle 120 can be connected by a shearing force supported by the locking unit 130.

The locking unit 130 may have both ends which are open. A locking protrusion 132 which is stopped at the nozzle 120 may be formed at one end 131a of the locking unit 130. A region 133 adjacent to another end 131b of the locking unit 130 may have the same section as that between the both ends 131a and 131b of the locking unit 130. The section of the region 133 adjacent to the another end 131b of the locking unit 130 may be rectangular. Thus, the fabrication of locking unit 130 can be simplified and the assembly of the locking unit 130 can be facilitated.

The thusly structured locking unit 130 can render the case 100 and the nozzle 120 of the rocket propulsion device 100 connected to each other within a narrower space.

Figure 6:
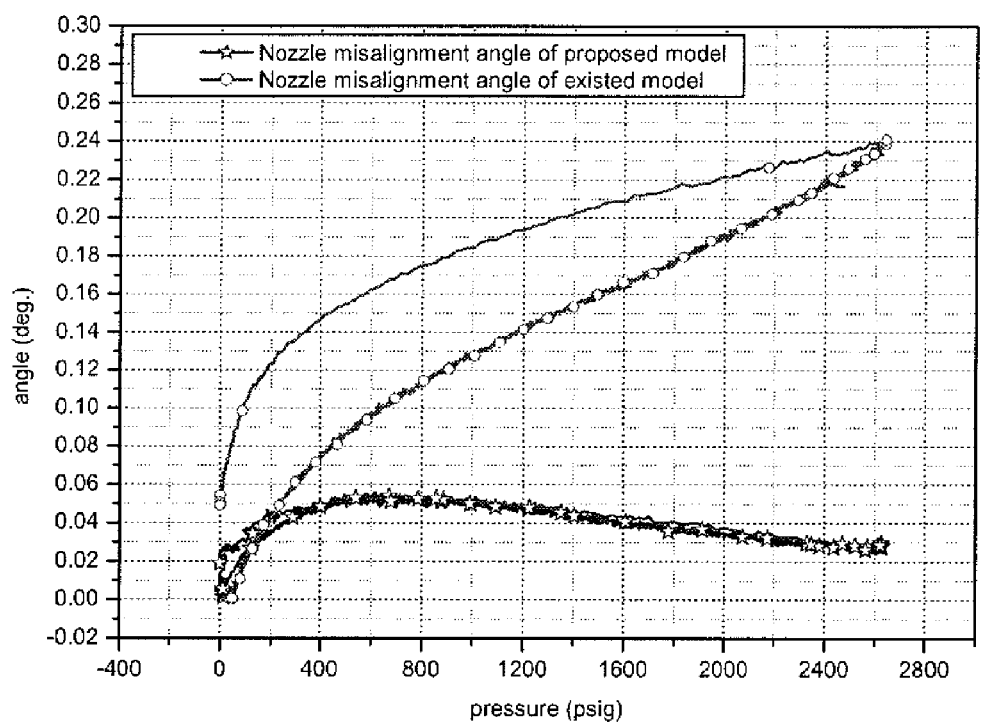
FIG. 6 is a graph showing measurement of a misalignment angle of a thrust line of a rocket propulsion device according to the present invention.

FIG. 6 is a graph showing the measurement of the misalignment angle of thrust line of the rocket propulsion device 100 according to the present invention.

In the graph, X-axis indicates pressure applied to the propulsion device and Y-axis indicates the misalignment angle of a thrust line. Referring to the graph, the maximum misalignment angle of the thrust line of the rocket propulsion device is 0.24° when the present invention is not applied, whereas the maximum misalignment angle of the thrust line is 0.05° when the present invention is applied, which indicates an excellent effect obtained by the present invention. Also, it can be noticed that when pressure applied to the propulsion device is over 1000 psi, the misalignment angle of the thrust line of the rocket propulsion device according to the present invention is maintained less than 0.05°.

The rocket propulsion device and the method for assembling the same according to the present invention may not be limited to the construction and method illustrated in the foregoing embodiments. Many variations can be embodied by selective combination of all or part of the embodiments.

Industrial Applicability

The rocket propulsion device and the method for assembling the same may be industrially applicable.

The invention claimed is:

1. A rocket propulsion device comprising:
   a tubular case of the rocket propulsion device for receiving a propellant;
   a nozzle at least partially inserted in the case, the nozzle being configured to discharge gas upon burning the propellant and to rotate with respect to a central axis of the nozzle: and
   a locking unit being configured to be wound on the nozzle, the locking unit in the form of a band having two open ends,
   wherein a through hole for inserting the locking unit therein is formed at a first region on the circumference of the case, and the both ends of the locking unit are located at a second region symmetrically opposite the first region with respect to the central axis, and
   wherein the through hole defines a first portion of fragile rigidity and the both ends of the locking unit define a second portion of fragile rigidity, the first portion of fragile rigidity and the second portion of fragile rigidity being symmetrically positioned with respect to the central axis, and
   wherein the nozzle and the case are fixed to one another through pins.

2. The device of claim 1, wherein the case comprises a first groove formed in an inner circumferential surface thereof and the nozzle comprises a second groove formed in an outer circumferential surface thereof, wherein the locking unit is inserted into the first and second grooves so as to connect the case and the nozzle to each other.

3. The device of claim 1, wherein a locking protrusion stopped at the nozzle is formed at one end of the locking unit.

4. The device of claim 3, wherein a region adjacent to another end of the locking unit has the same section as that between the both ends of the locking unit.

5. A method for assembling a rocket propulsion device, the method comprising:
   at least partially inserting a nozzle into a tubular case of the rocket propulsion device, the nozzle being configured to rotate with respect to a central axis of the nozzle;
   inserting a locking unit through a through hole to be wound on the nozzle, the through hole formed at a first region on the circumference of the case, the locking unit comprising two open ends and a locking protrusion formed at one of the two ends;
   locking the locking protrusion at the nozzle;
   locating the both ends of the locking unit at a second region facing the one region symmetrically opposite the first region with respect to the central axis; and
   fixing the nozzle to restrict a relative movement between the case and the nozzle;
   wherein the through hole defines a first portion of fragile rigidity and the both ends of the locking unit define a second portion of fragile rigidity, the first portion of fragile rigidity and the second portion of fragile rigidity being symmetrically positioned with respect to the central axis, and
   wherein the nozzle and the case are fixed to one another through pins.

* * * * *